United States Patent
De Hesselle et al.

(10) Patent No.: US 10,279,799 B2
(45) Date of Patent: May 7, 2019

(54) DYNAMIC TORQUE PROFILES BASED ON DRIVE MODE SELECTION

(71) Applicant: Ford Global Technologies, LLC, Dearborn, MI (US)

(72) Inventors: Eric De Hesselle, Clarkston, MI (US); Raymond C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 15/376,986

(22) Filed: Dec. 13, 2016

(65) Prior Publication Data

US 2018/0162354 A1 Jun. 14, 2018

(51) Int. Cl.
| | |
|---|---|
| *B60K 17/348* | (2006.01) |
| *B60W 20/13* | (2016.01) |
| *B60K 6/52* | (2007.10) |
| *B60W 10/06* | (2006.01) |
| *B60W 10/119* | (2012.01) |
| *B60W 30/18* | (2012.01) |
| *B60K 17/354* | (2006.01) |
| *B60K 17/356* | (2006.01) |
| *B60K 23/08* | (2006.01) |

(52) U.S. Cl.
CPC ............... *B60W 20/13* (2016.01); *B60K 6/52* (2013.01); *B60K 17/348* (2013.01); *B60K 17/354* (2013.01); *B60K 17/356* (2013.01); *B60K 23/08* (2013.01); *B60W 10/06* (2013.01); *B60W 10/119* (2013.01); *B60W 30/18036* (2013.01); *B60K 2023/085* (2013.01); *B60W 2510/244* (2013.01); *B60W 2520/403* (2013.01); *B60W 2710/0666* (2013.01); *B60W 2710/083* (2013.01); *B60W 2720/403* (2013.01); *B60Y 2200/92* (2013.01); *B60Y 2300/188* (2013.01); *B60Y 2300/18033* (2013.01); *Y02T 10/7258* (2013.01); *Y10S 903/93* (2013.01)

(58) Field of Classification Search
CPC .............................. B60W 20/13; B60K 6/52
See application file for complete search history.

(56) References Cited

U.S. PATENT DOCUMENTS

| | | | |
|---|---|---|---|
| 8,092,340 B2 | 1/2012 | Song et al. | |
| 8,433,465 B2 * | 4/2013 | Yamazaki | B60K 6/448 701/22 |
| 8,512,189 B2 | 8/2013 | Holmes et al. | |
| 8,596,390 B2 | 12/2013 | Soliman et al. | |
| 9,096,226 B2 | 8/2015 | Yu et al. | |
| 2002/0105188 A1 * | 8/2002 | Tomikawa | B60K 6/44 290/40 C |

(Continued)

*Primary Examiner* — Jess Whittington
(74) *Attorney, Agent, or Firm* — David Kelley; Brooks Kushman, P.C.

(57) ABSTRACT

A method for controlling an electric rear axle drive (eRAD) includes, responsive to a vehicle being in DRIVE, operating the eRAD such that any torque output by the eRAD to drive rear wheels forward is less than torque output to drive front wheels forward. The method further includes, responsive to the vehicle being in REVERSE, operating the eRAD such that torque output by the eRAD to drive the rear wheels backwards is more than any torque output to drive the front wheels backwards.

6 Claims, 3 Drawing Sheets

(56) References Cited

U.S. PATENT DOCUMENTS

| | | | |
|---|---|---|---|
| 2002/0107617 A1* | 8/2002 | Tomikawa | B60K 6/44 |
| | | | 701/22 |
| 2003/0015874 A1* | 1/2003 | Abe | B60K 6/48 |
| | | | 290/40 C |
| 2009/0093337 A1* | 4/2009 | Soliman | B60K 6/442 |
| | | | 477/5 |
| 2009/0171523 A1* | 7/2009 | Luo | B60W 20/40 |
| | | | 701/22 |
| 2009/0326778 A1* | 12/2009 | Soliman | B60K 6/442 |
| | | | 701/84 |
| 2012/0083955 A1* | 4/2012 | Noguchi | B60K 6/52 |
| | | | 701/22 |
| 2014/0039767 A1* | 2/2014 | Jensen | B60K 23/0808 |
| | | | 701/50 |
| 2014/0039772 A1* | 2/2014 | Jensen | B60K 23/0808 |
| | | | 701/69 |
| 2016/0121883 A1* | 5/2016 | Mao | B60W 30/02 |
| | | | 701/69 |

* cited by examiner

DYNAMIC TORQUE PROFILES BASED ON DRIVE MODE SELECTION

TECHNICAL FIELD

This disclosure relates to controlling an electrified vehicle powertrain based on a selected drive mode, and more particularly, to adjusting torque profiles of an electrified vehicle powertrain having an engine and an electric motor.

BACKGROUND

A hybrid electric vehicle (HEV) powertrain may be arranged with a first and second vehicle propulsion torque path. The first path may include an engine connected to an electric machine, such as a crank integrated starter-generator (CISG), and a multiple-speed, discrete ratio transmission connected to the electric machine; the first torque path being driveably connected to a first set of vehicle wheels. The second torque path includes an electric motor driveably connected to a second set of vehicle wheels, producing an electric rear axle drive (eRAD).

In a front wheel drive (FWD) vehicle, engine propulsion serves to "pull" the vehicle forward when operating in the forward drive gear. However, when operating in the reverse drive gear, engine propulsion serves to "push" the vehicle backward. When operating on a low friction surface such as snow or ice, this pushing effect may cause the vehicle to yaw in an undesirable manner.

SUMMARY

A method for controlling an electric rear axle drive (eRAD) includes, responsive to a vehicle being in DRIVE, operating the eRAD such that any torque output by the eRAD to drive rear wheels forward is less than torque output to drive front wheels forward. The method further includes, responsive to the vehicle being in REVERSE, operating the eRAD such that torque output by the eRAD to drive the rear wheels backwards is more than any torque output to drive the front wheels backwards.

In another approach, a vehicle control system includes a controller programmed to, responsive to a vehicle being in DRIVE, operate a propulsion system to drive front wheels forward. the controller is further configured to, responsive to the vehicle being in REVERSE, operate an electric motor driveably connected to only rear wheels to drive the rear wheels backwards such that torque output by the electric motor is greater than any torque output by the propulsion system to drive the front wheels backwards.

In still another approach, a method for controlling a vehicle includes, responsive to the vehicle being in DRIVE, operating an electric motor driveably connected to only vehicle front wheels to drive the front wheels forward. The method further includes, responsive to the vehicle being in REVERSE, operating a propulsion system to drive vehicle rear wheels backward such that torque output by the propulsion system is greater than any torque output by the electric motor to drive the front wheels backwards.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
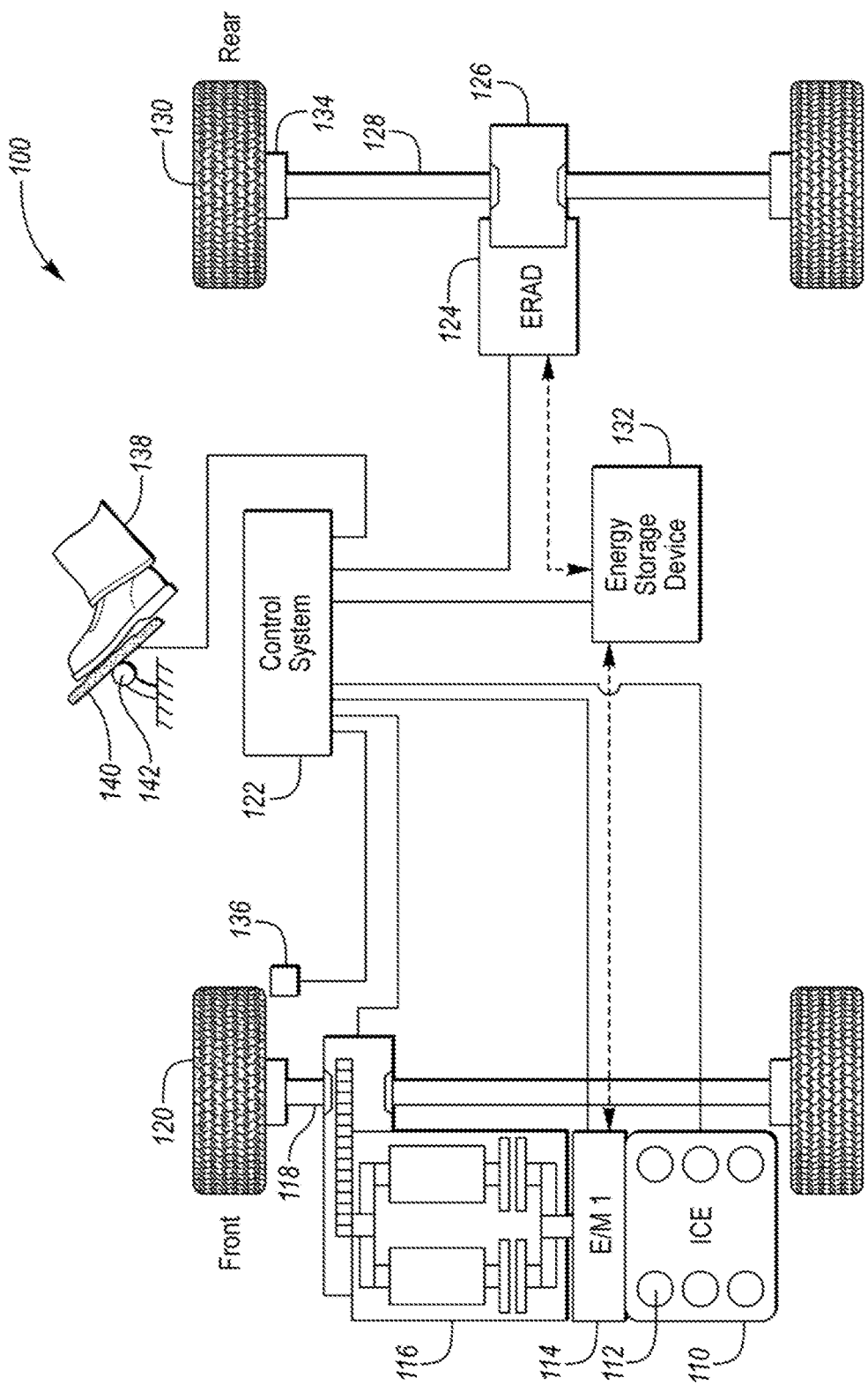
FIG. 1 is a schematic diagram of a schematic propulsion system for an electrified vehicle.

FIG. 1 schematically illustrates an example propulsion system 100 that may be utilized in an electrified vehicle such as a battery-electric vehicle (BEV), plug-in hybrid-electric vehicle (PHEV), mild hybrid-electric vehicle (MHEV), or full hybrid-electric vehicles (FHEV). In this particular example, the propulsion system 100 is configured as a hybrid electric vehicle operated in conjunction with a front wheel drive (FWD) vehicle platform. However, the approaches described herein may be applied to other vehicle platforms including rear wheel drive (RWD), four-wheel drive (4WD), or all-wheel drive (AWD) systems. The propulsion system 100 may include a powertrain having an internal combustion engine (ICE) 110, a first electric energy conversion device 114, a transmission 116 for providing torque to front wheels 120, and a second electric energy conversion device 124 for providing torque to rear wheels 130. In a preferred approach, the propulsion system 100 includes a power split transmission architecture (e.g., an electric continuously variable transmission (eCVT)). While not shown in FIG. 1, it is contemplated that the vehicle may be a BEV and may not have an internal combustion engine 110.

Engine 110 may include one or more combustion chambers or cylinders 112 for combusting a fuel. It will be appreciated that, during different modes of operation, the engine may discontinue combustion of fuel in some or all of the cylinders. In this way, fuel efficiency may be increased.

The first and second electric energy conversion devices may be alternatively referred to as motors and/or generators. It will be appreciated that an electric energy conversion device may be any suitable device for converting electric energy to kinetic energy and/or kinetic energy to electric energy.

First motor 114 may be coupled to an output shaft of engine 110. In some approaches, the first motor 114 may be in operative communication with the engine via a gear configuration. As one non-limiting example, first motor 114 may be an electric motor that may provide propulsion in conjunction with or independently of the engine 110 for forward and reverse motions. When the first motor 114 provides propulsion, independently of the engine 110, the propulsion system 100 is operating in "electric drive" or electric-only mode or EV mode. As another non-limiting example, the first motor 114 may be an integrated starter/generator (ISG) system (e.g., belt integrated starter/generator or crankshaft integrated starter/generator) that are is not capable of propelling the vehicle but is capable of supporting a rapid start of the engine 110 as well as on/off operation of the engine while the vehicle is stationary. For example, during startup of the hybrid propulsion system, the ISG may provide torque to turn the engine to facilitate startup of the engine 110. Under some conditions, the ISG may supply torque output to supplement or replace engine torque. Further, under some conditions, the ISG may supply negative torque output that may be converted into electric energy.

Engine 110 and/or first motor 114 may transmit torque to an input of transmission 116. Transmission 116 may transmit torque to front wheels 120 via front axle (or final drive) 118. Transmission 116 may include two or more selectable gear ratios that can be used to vary the ratio of speed and/or torque that is exchanged between the transmission input (i.e. the engine/first motor) and the transmission output (i.e. final drive/front wheels). As one non-limiting example, transmission 116 may include six selectable gears, however, other transmissions having more or less gears may be used. Transmission 116 may also be configured as a continuously variable transmission (CVT). Further, transmission 116 may be configured as a dual-clutch (i.e. powershift) or automatically shifted manual transmission or any converter-less automatic transmission all of which do not use a torque converter. In alternative embodiments, transmission 116 may include a torque converter comprising an impeller and a turbine. The transmission may be engaged or disengaged by varying a state of the torque converter to vary the torque transfer between the impeller and the turbine.

It will be appreciated that first motor 114 may be configured in a motor system that includes any suitable gearing to enable first motor 114 to be selectively operated independent from engine 110. For example a clutch may be used to provide an operative disconnect in between the first motor 114 and the engine 110 to reduce frictional torque losses from the engine while the first motor 114 is used to generate electrical energy.

Continuing with FIG. 1, a second electric machine 124 may be communication in communication with the rear axle 128 and rear wheels 130 via a gear configuration (or final drive) 126. In a preferred approach, the second electric energy conversion device (or motor) 124 may be configured as what may be referred to as an electric rear axle device (eRAD) system. The eRAD system may include any suitable gearing to enable the second motor to provide torque output to the rear wheels. For example, the gear configuration 126 may include a planetary gear set comprising a carrier (C), a sun gear (S), and a ring gear (R). By varying a state of the planetary gear set, an amount of torque exchanged between the second motor 124 and the final shaft 128 may be varied. In this way, the second motor 124 may selectively supply or absorb torque to the drive shaft 128 and the rear wheels 130. In alternative approaches, the second motor 124 may be coupled directly to the final drive 128.

Although this description refers to the electric machine being an eRAD, implying that front axle 118 and front wheels 120 are driven by the engine 110 and transmission 116, the electric machine could instead be an Electric Front Axle Drive (EFAD), in which case the front axle 118 and the front wheels 120 are driven by the EFAD and the rear axle 128 and rear wheels 130 are driven by the engine 110 and transmission 116.

The first motor 114 and eRAD system 124 may be operated to exchange torque with drive shafts 118 and 128, respectively. For example, the first motor 114 can be operated to supply torque to drive shaft 118 in response to electrical energy received from energy storage device 132. Similarly, eRAD system 124 can be operated to supply torque to drive shaft 128 in response to electrical energy received from energy storage device 132. In this manner, the first motor 114 and/or eRAD system 124 can be operated to assist the engine to propel the vehicle or to propel the vehicle without operation of the engine. Furthermore, the first motor 114 and/or eRAD system 124 can be selectively operated to absorb torque from drive shafts 118 and 128, respectively, whereby the energy may be stored at energy storage device 132 or exchanged between the first motor 114 and eRAD system 124. For example, electrical energy generated by the eRAD system 124 can be supplied to the first motor 114 to rotate engine 110 as means of dissipating energy. Further, in one example, valve timing of the engine may be adjusted to increase pumping losses to change affect the rate of energy dissipation from the energy storage device. As another example, where the first motor 114 is connected to the engine output shaft via a gear configuration, the reduction ratio of the gear configuration may be adjusted to change the rate of energy dissipation. During an energy dissipation operation, under some conditions, the first motor 114/engine 110 may be disengaged from the transmission such that no torque is transmitted to the wheels.

Energy storage system 132 may include one or more batteries, capacitors, or other suitable energy storage devices. It will be appreciated that each of front wheel 120 and rear wheels 130 may include one or more friction brakes 134 to provide supplemental braking for deceleration of the vehicle.

A control system 122 may be communicatively coupled to some or all of the various components of hybrid propulsions system 100. For example, control system 122 can receive operating condition information from engine 110 such as engine speed, first motor 114, transmission 116 including the current gear selected, transmission turbine and drive shaft speeds, torque converter state, eRAD 124, energy storage device 132 including state of charge (SOC) and charge rate, wheels 120 and 130 including vehicle speed, and the position of the friction brakes.

The control system 122 can also receive vehicle operator input via a vehicle operator input device. For example, the control system 122 may receive signals representing a position of a PRNDL gear lever selector 136 as selected by a user 138. In some approaches, the control system 122 may receive signals representing the magnitude of displacement from a reference position of an accelerator pedal 140 as detected by pedal position or pressure sensor 142. The control system 122 may also receive various other signals regarding conditions of various vehicle components. For example, the control system 122 may receive signals representing the start or stopped status of an engine ignition key, signals representing the magnitude of displacement from a reference position of a brake pedal, signals representing the angular displacement from a reference position of a steering wheel, signals representing a desired vehicle speed selected through a vehicle speed control system, and signals representing a selected air temperature and supply vent through which air is supplied to a passenger compartment through a climate control system. The control system 122 may also include other suitable sensors for determining other vehicle operating conditions.

The control system 122 can send control signals to engine 110 to control fuel delivery amount and timing, spark timing, valve timing, throttle position, among other engine operating parameters, first motor 114 to control the amount of torque exchanged with transmission 116 and/or engine 110, transmission 116 to change gear selection and to control the state of the torque converter or clutch(s), eRAD 124 to control the amount of torque exchanged with driveshaft 128, energy storage device 132 to control the amount of energy received from or supplied to the eRAD and first motor systems, and the friction brakes to vary an amount of braking force applied at the wheels 120 and 130. It will be appreciated by one of skill in the art in light of the present disclosure that the control system may adjust operating parameters of the various driveline components via electro-mechanical or electro-hydraulic actuators, or other suitable device.

Control system 122 may include one or more microcomputers, including a microprocessor unit, input/output ports, an electronic storage medium for executable programs and calibration values configured as read only memory chip, random access memory, and/or keep alive memory, and a data bus. Thus, it will be appreciated that control system 122 can execute the various control routines described herein in order to control the operation of hybrid propulsion system 100.

In some approaches, control system 122 may include a plurality of control modules and each of the control modules may control a subsystem of the vehicle. For example, control system 122 may include an engine control module (ECM) to control engine operation, a transmission control module (TCM) to control transmission operation, and an integrated system controller (ISC) to control operation of the electric energy conversion and storage devices.

Figure 2:
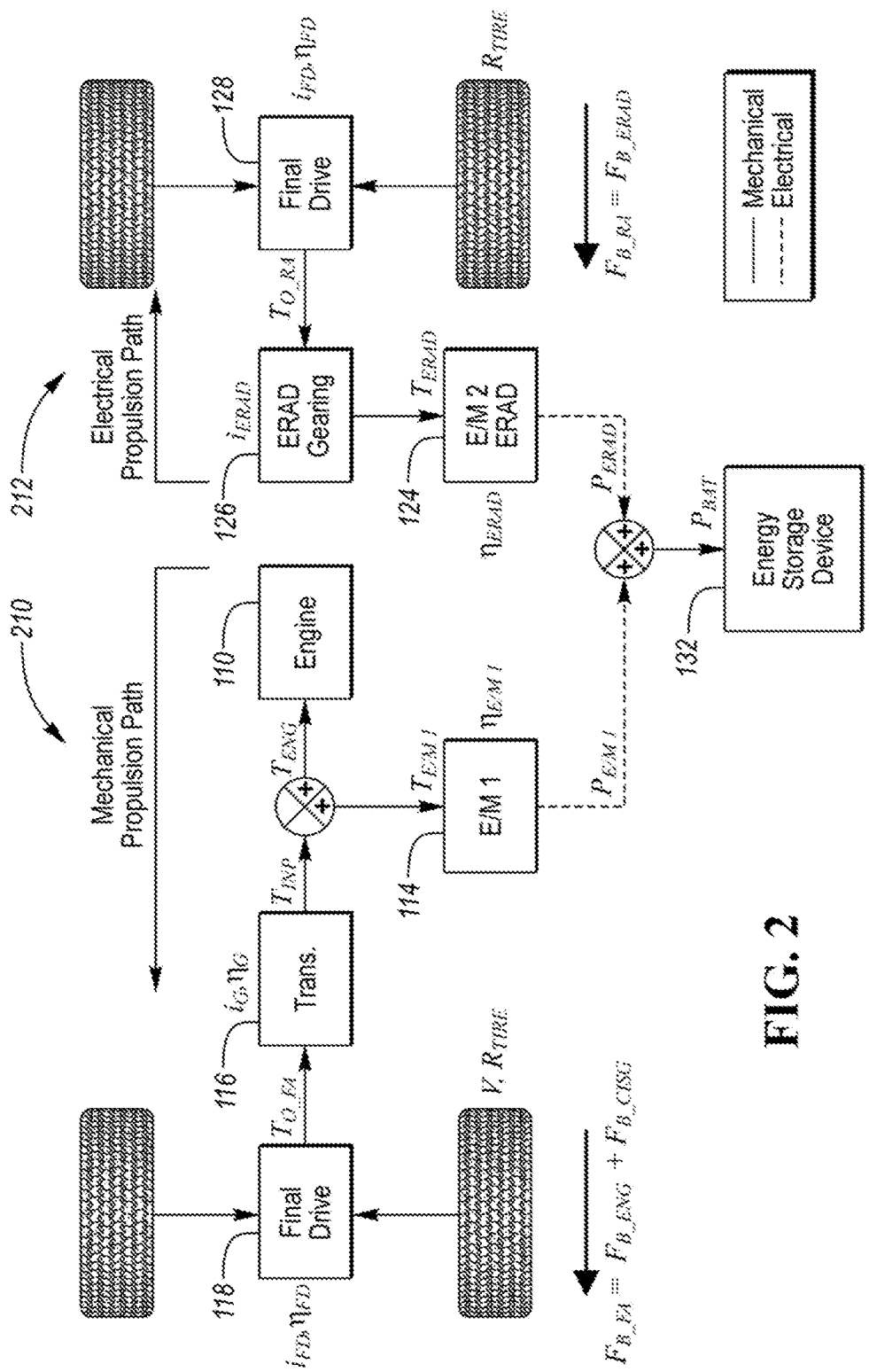
FIG. 2 is an energy flow diagram of the propulsion system of FIG. 1.

FIG. 2 shows an example energy flow diagram corresponding to the hybrid propulsion system of FIG. 1. The energy flow diagram includes mechanical propulsion path 210 and electrical propulsion path 212. Mechanical propulsion path 210 may provide vehicle propulsion to front axle (or final drive) 118 and front wheels 120. In particular, engine 110 and/or first motor 114 may generate torque output that may be transmitted through transmission 116 to provide torque to front wheel 120 to propel vehicle (or propulsion system) 100. Further, during a deceleration condition, engine 110 and/or first motor 114 may be operated to generate negative torque transmitted through transmission 116 to front wheels 120 to provide engine braking capabilities to decelerate the vehicle.

Electrical propulsion path 212 may provide vehicle propulsion by providing torque directly to the rear axle (or final drive) 128 and rear wheels 130. In particular, eRAD 124 may generate torque output that may be transferred through eRAD gearing 126 and rear axle 128 to rear wheels 130 to propel the vehicle. Further during a deceleration condition, eRAD 124 may be operated to generate negative torque transmitted through eRAD gearing 126 to rear wheels 130 to provide braking capabilities to decelerate the vehicle.

During vehicle operation, the control system may direct torque output through the mechanical propulsion path 210 and/or electrical propulsion path 212 to operate the vehicle in different operating modes. For example, the control system may operate the vehicle in what may be referred to as electric drive in which only the eRAD may be controlled to provide motoring/generating capabilities (i.e., positive torque output and negative torque output, respectively).

Referring again to FIG. 1, the control system 122 is configured to operate the powertrain 100 according to various profiles depending on a commanded drive mode of the vehicle. More particularly, the control system 122 is configured to operate the eRAD 124 according to a first torque profile ($\tau_1$) while in a forward drive mode (DRIVE). The control system 122 is further configured to operate the eRAD 124 according to a second torque profile ($\tau_2$) while in a reverse drive mode (REVERSE). Preferably, in the second torque profile $\tau_2$, the control system 122 commands the eRAD 124 to apply a greater amount of torque to the rear axle 128 than is applied to the front axle 118. As used herein, a torque profile refers to the amount of torque applied by a propulsion system (e.g., engine 110, eRAD 124). The torque profile may be a positive torque profile (i.e., when the vehicle is in DRIVE), or may be a negative torque profile (i.e., when the vehicle is in REVERSE).

In this way, the control system 122 commands the powertrain 100 to "pull" the vehicle while operating in a forward drive mode, similar to known powertrains of front wheel drive vehicles. However, whereas such known powertrains act to "push" a vehicle in the reverse direction (due to the torque split favoring the propulsion system at the front of the vehicle), the control system 122 of the present disclosure commands a change in the torque split when changing to a reverse drive mode. By commanding a greater torque at the rear propulsion system (e.g., eRAD 124) as compared to the front propulsion system (e.g., engine 110), the control system 122 commands the powertrain 100 to "pull" the vehicle while operating in a reverse drive mode.

The control system 122 provided herein operates components of the powertrain 100 according to two or more torque profiles. The torque profiles may be a function of the operating mode of the vehicle (e.g., a forward drive mode or a reverse drive mode) and total torque required to accelerate the vehicle. As used herein, a total torque command (also referred to as total commanded torque) is a torque value (e.g., in Newton meters (Nm)) required to provide an acceleration commanded by a vehicle operator, for example, at accelerator pedal 140. In each torque profile, the total commanded torque is allocated between various propulsion devices (e.g., engine 110 and eRAD 124) of the powertrain 100.

The front and rear propulsion systems may be operated in a range from 0 Nm of torque to the maximum available torque of the respective propulsion system. For example, a front propulsion system may include an engine 110, a motor 114, a combination of an engine 110 and a motor 114, or any suitable combination of front propulsions devices. The maximum torque output of a front propulsion system may be, for example, in the range of 2,300 Nm to 2,700 Nm. A rear propulsion system, such as eRAD 124, may have a maximum torque output, for example, in the range of 1,300 Nm to 1,800 Nm. In one example, a vehicle may include a front propulsion system having a maximum torque output of 2,500 Nm and a rear propulsion system having a maximum torque output of 1,500 Nm. In this example, the total system propulsion torque is 4,000 Nm.

In a preferred approach, when the eRAD 124 is operated according to the first torque profile $\tau_1$, the eRAD 124 provides less than 50% of the total commanded torque to the second set of wheels 130 via the rear axle 128. For example, while operating in a forward drive mode, the eRAD 124 may provide 10-40%, and more particularly 30% or less, of the total commanded torque to the rear axle 128, while the engine 110 provides 60-90%, and more particularly 70% or more, of the total commanded torque to the front axle 118. In this example, a control system 122 receiving a total torque command of 1,000 Nm may allocate 700 Nm of torque to the front axle 118 and 300 Nm of torque to the rear axle 128 to accelerate the vehicle in the forward direction.

In some approaches, the eRAD 124 provides less than 10% (e.g., 0%) of the total commanded torque to the rear axle 128 while the vehicle is operated in the forward drive mode. Thus, in one approach, the eRAD 124 does not provide torque to the rear axle 128 in the first torque profile $\tau_1$.

When the eRAD 124 is operated according to the second torque profile $\tau_2$, the eRAD 124 provides more than 50% of the total commanded torque to the second set of wheels 130. For example, while operating in a reverse drive mode, the eRAD 124 may provide 60-90%, and more particularly 70% or more, of the total commanded torque to the rear axle 128, while the engine 110 provides 10-40%, and more particularly 30% or less, of the total commanded torque to the front axle 118. In this example, a control system 122 receiving a total torque command of 1,000 Nm may allocate 700 Nm of torque to the rear axle 128 and 300 Nm of torque to the front axle 118 to accelerate the vehicle in the reverse direction.

In some approaches, the eRAD 124 provides more than 90% (e.g., 100%) of the total commanded torque to the rear axle 128 while the vehicle is operated in the reverse drive mode. Thus, in one approach, the engine 110 does not provide torque to the front axle 118 in the second torque profile $\tau_2$.

Because the eRAD 124 acts to "pull" the vehicle when the vehicle is operated in the reverse drive mode, vehicle control is improved, particularly on low friction surfaces such as water, snow, or ice. On such low friction surfaces, front-driven vehicles (e.g., front wheel drive vehicles) are more susceptible to undesirable vehicle movements such as vehicle yaw, particularly when the vehicle is on a sloped surface. Increasing the "pull" effect on a vehicle and decreasing the "push" effect has been found to improve control of such undesirable vehicle movements.

Figure 3:
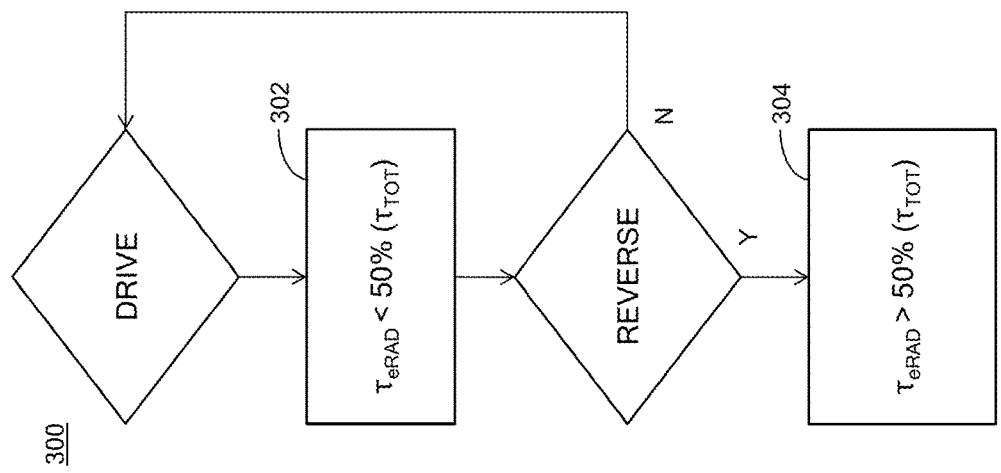
FIG. 3 is flow chart illustrating an embodiment of an algorithm for torque allocation.

Referring now to FIG. 3, a method 300 is provided for controlling an electric rear axle drive (eRAD). The method 300 includes, in response to a vehicle being in DRIVE, operating 302 the eRAD such that torque output by the eRAD to drive rear wheels forward is less than 50% of a total commanded torque. As described elsewhere herein, the total commanded torque is a torque value (e.g., in Newton meters (Nm)) required to provide an acceleration commanded by a vehicle operator, for example, at accelerator pedal 140 of FIG. 1. The total commanded torque includes torque applied at the various propulsion systems described herein, including engine 110, first motor 114, and/or the eRAD 124.

The method further includes, in response to the vehicle being in REVERSE, operating 304 the eRAD such that torque output by the eRAD to drive the rear wheels backwards is more than 50% of the total commanded torque.

In some approaches, the method further includes subsequently adjusting the torque allocation such that torque output by the eRAD to drive the rear wheels backwards is reduced, and torque output by a forward propulsion system (e.g., engine 110, first motor 114) to drive the front wheels backwards is increased. For example, in response to a state of charge (SOC) of the eRAD decreasing below a threshold (e.g., 10% SOC), torque output by the eRAD to drive the rear wheels backwards is reduced to less than 50% of the total commanded torque, and more particularly, may be reduced to 0% of the total commanded torque. In another example, in response to determining insufficient traction at the rear wheels (e.g., due to a low friction surface such as water, snow, or ice), torque output by the eRAD to drive the rear wheels backwards is reduced to less than 50% of the total commanded torque, and more particularly, may be reduced to 0% of the total commanded torque. The insufficient traction may be determined at a traction control system, or may be determined in response to a signal received from a traction control system. In still another example, in response to insufficient available torque at the eRAD, torque output by the eRAD to drive the rear wheels backwards is reduced to less than 50% of the total commanded torque, and more particularly, may be reduced to 0% of the total commanded torque. Such may be the case, for example, when the total commanded torque is greater than a total available torque at the eRAD.

Figure 4:
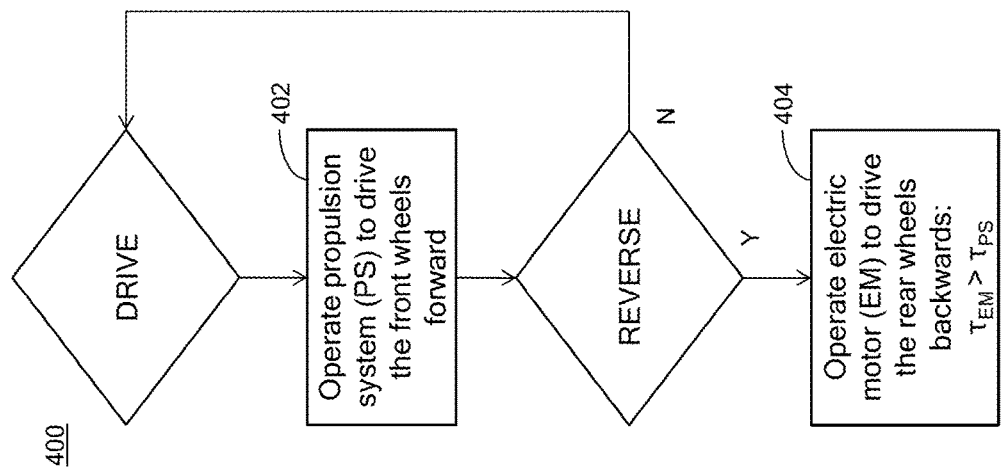
FIG. 4 is flow chart illustrating another embodiment of an algorithm for torque allocation.

Referring now to FIG. 4, a method 400 is provided for controlling an electrified vehicle having a front wheel drive powertrain that includes a propulsion system driveably connected to front wheels of the vehicle and an electric motor driveably connected to only rear wheels of the vehicle. In one approach, the propulsion system of front wheels is an internal combustion engine. In another approach, the propulsion system of the front wheels is an electric machine. In still another approach, the propulsion system of the front wheels is hybrid system having both an internal combustion engine and an electric machine.

The method 400 includes, responsive to the vehicle being in a forward drive mode (DRIVE), operating 402 the propulsion system to drive the front wheels forward. The method 400 further includes, responsive to the vehicle being in a reverse drive mode (REVERSE), operating 404 the electric motor to drive the rear wheels backwards. The electric motor is operated such that torque output by the electric motor to drive the rear wheels backwards is greater than any torque output by the propulsion system to drive the front wheels backwards. In this way, the electric motor provides more than 50% of the total commanded torque to the second set of wheels.

Figure 5:
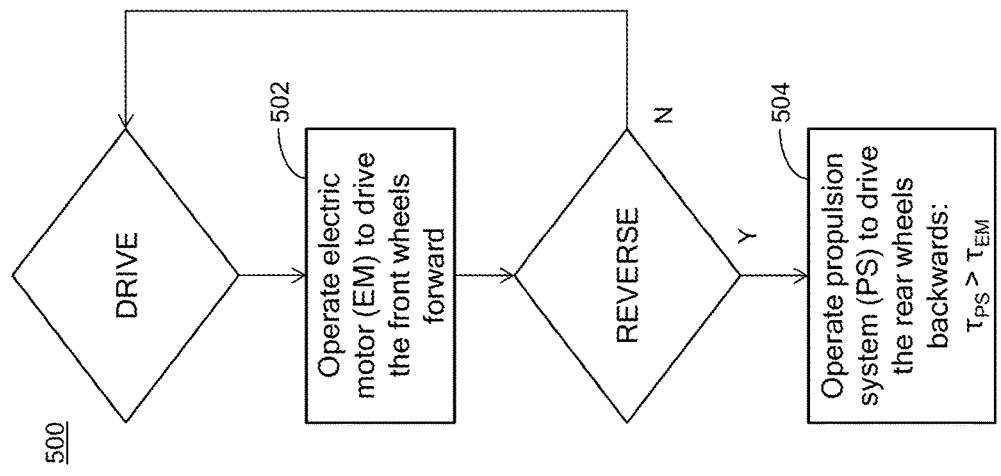
FIG. 5 is flow chart illustrating another embodiment of an algorithm for torque allocation.

Referring now to FIG. 5, a method 500 is provided for controlling an electrified vehicle having a rear wheel drive powertrain that includes an electric motor driveably connected to only front wheels of the vehicle and a propulsion system driveably connected to rear wheels of the vehicle. In one approach, the propulsion system of the rear wheels is an internal combustion engine. In another approach, the propulsion system of the rear wheels is an electric machine. In still another approach, the propulsion system of the rear wheels is hybrid system having both an internal combustion engine and an electric machine.

The method 500 includes, responsive to the vehicle being in a forward drive mode (DRIVE), operating 502 the electric motor to drive the front wheels forward. The method 500 further includes, responsive to the vehicle being in a reverse drive mode (REVERSE), operating 504 the propulsion system to drive the rear wheels backwards. The propulsion system is operated such that torque output by the propulsion system to drive the rear wheels backwards is greater than any torque output by the electric motor to drive the front wheels backwards. In this way, the propulsion system provides more than 50% of the total commanded torque to the second set of wheels.

In still another approach, a method for operating a powertrain of an electric vehicle includes operating the electrified vehicle in a forward drive mode. While operating the electrified vehicle in a forward drive mode, the method provides for operating the powertrain according to a first torque profile $\tau_1$. In the first torque profile $\tau_1$, at least the propulsion system drives the first set of wheels. Preferably, when the powertrain is operating according to the first torque profile $\tau_1$, the propulsion system provides more than 50% of a total commanded torque to the first set of wheels, and the electric motor provides less than 50% of the total commanded torque to the second set of wheels.

In some approaches, the method further includes receiving a command to operate the electrified vehicle in a park mode. The command may be received, for example, at the PRNDL gear lever selector 136 shown in FIG. 1, or at an electric park brake (not shown). In response to receiving the command, the method includes operating the electrified vehicle in a park mode (e.g., shifting the vehicle transmission to park).

While in the park mode, the method includes receiving a command to operate the electrified vehicle in a reverse drive mode. The command may be received, for example, at the PRNDL gear lever selector 136 or the accelerator pedal 140 shown in FIG. 1. In response to receiving the command, the method includes operating the electrified vehicle in the reverse drive mode.

While operating the electrified vehicle in the reverse drive mode, the method includes operating the powertrain according to a second torque profile $\tau_2$. In the second torque profile $\tau_2$, at least the electric motor drives the second set of wheels. Also in the second torque profile $\tau_2$, the electric motor applies more torque to the second set of wheels than in the first torque profile $\tau_1$. Preferably, when the powertrain is operating according to the second torque profile $\tau_2$, the electric motor provides more than 50% of the total commanded torque to the second set of wheels, and the propulsion system provides less than 50% of a total commanded torque to the first set of wheels.

In some approaches, the second torque profile is a dynamic second torque profile. In such approaches, torque applied by the electric motor to the second set of wheels is a function of an estimated road condition. The estimated road condition may be, for example, a measured amount of wheel slip at an individual wheel. The estimated road condition may also be, for example, a determined road grade. In this way, the second torque profile may vary from application to application and from time to time based on one or more conditions detected by the vehicle. Thus, the electric motor may provide a first amount of torque to the second set of wheels when a sensor or controller determines the vehicle is on a high friction surface. The electric motor may provide a second amount of torque, greater than the first amount of torque, to the second set of wheels when the sensor or controller determines the vehicle is now on a low friction surface. Increased torque at the rear set of wheels provides more "pull" and less "push" by the powertrain as the vehicle is operated in a reverse drive mode.

In another approach, a method for controlling a vehicle includes operating an electric rear axle drive system (eRAD) according to a first torque profile when in a forward drive mode. The method further includes receiving, while in a park mode, a command to operate the vehicle in a reverse drive mode. The method further includes operating the eRAD according to a second torque profile when in the reverse drive mode. Torque distribution in the second torque profile is different than in the first torque profile.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling an electric rear axle drive (eRAD), comprising:
   responsive to a vehicle being in DRIVE, operating the eRAD such that torque output by the eRAD to drive rear wheels forward is less than 50% of a total commanded torque;
   responsive to the vehicle being in REVERSE, operating the eRAD such that torque output by the eRAD to drive the rear wheels backwards is 60-90% of the total commanded torque; and
   reducing torque output by the eRAD to drive the rear wheels backwards to less than 50% of a total commanded torque in response to a total commanded torque being greater than a total available torque at the eRAD.

2. The method of claim 1 further comprising:
   reducing torque output by the eRAD to drive the rear wheels backwards to less than 50% of a total commanded torque in response to a state of charge (SOC) decreasing below a threshold of 10% SOC.

3. The method of claim 1 further comprising:
   reducing torque output by the eRAD to drive the rear wheels backwards to less than 50% of a total commanded torque in response to a determination of low traction at the rear wheels.

4. The method of claim 1 wherein while in DRIVE, torque output by the eRAD to drive the rear wheels forward is 30%.

5. The method of claim 1 wherein while in REVERSE, torque output by the eRAD to drive the rear wheels backwards is 70%.

6. A method for controlling an electric rear axle drive (eRAD), comprising:
   responsive to the vehicle being in REVERSE, by the eRAD, effecting a rear torque output to drive rear wheels backwards; and
   while in REVERSE, responsive to a detected condition, reducing the rear torque output by the eRAD to 0% of the total commanded torque such that front torque output to drive front wheels backwards is more than the rear torque output by the eRAD.

* * * * *